(12) United States Patent
Ozaki et al.

(10) Patent No.: US 11,274,969 B2
(45) Date of Patent: Mar. 15, 2022

(54) METHOD AND SYSTEM FOR TERAHERTZ RADIATION DETECTION AND CHARACTERIZATION

(71) Applicant: INSTITUT NATIONAL DE LA RECHERCHE SCIENTIFIQUE, Quebec (CA)

(72) Inventors: Tsuneyuki Ozaki, Brossard (CA); Xin Chai, Montreal (CA)

(73) Assignee: INSTITUT NATIONAL DE LA RECHERCHE SCIENTIFIQUE

( * ) Notice: Subject to any disclaimer, the term of this patent is extended or adjusted under 35 U.S.C. 154(b) by 561 days.

(21) Appl. No.: 16/317,898

(22) PCT Filed: Jul. 14, 2017

(86) PCT No.: PCT/CA2017/050852
§ 371 (c)(1),
(2) Date: Jan. 15, 2019

(87) PCT Pub. No.: WO2018/014118
PCT Pub. Date: Jan. 25, 2018

(65) Prior Publication Data
US 2021/0325250 A1    Oct. 21, 2021

Related U.S. Application Data

(60) Provisional application No. 62/364,377, filed on Jul. 20, 2016.

(51) Int. Cl.
*G01J 4/04*     (2006.01)
*G01J 9/00*     (2006.01)

(52) U.S. Cl.
CPC .. *G01J 4/04* (2013.01); *G01J 9/00* (2013.01)

(58) Field of Classification Search
CPC ..................................... G01J 4/04; G01J 9/00
See application file for complete search history.

(56) References Cited

U.S. PATENT DOCUMENTS 5,045,701 A   9/1991   Goldstein et al.
6,111,416 A   8/2000   Zhang et al.
(Continued)

OTHER PUBLICATIONS

Chan, Wai Lam, Deibel, Jason, and Mittleman, Daniel M., Imaging with terahertz radiation, Reports on progress in physics 70.8 (2007): 1325.
(Continued)

*Primary Examiner* — Mark R Gaworecki
(74) *Attorney, Agent, or Firm* — Lavery, De Billy, LLP; Gwendoline Bruneau

(57) ABSTRACT

A characterization and detection method and system, the system comprising a terahertz beam source, a probe beam source, a detection crystal receiving a probe beam from the probe beam source and a terahertz beam from the terahertz beam source, the probe beam and the terahertz beam co-propagating collinearly through the detection crystal, and a polarizer analyser receiving the pump beam transmitted from the detection crystal, wherein the polarizer analyser comprises two liquid crystal variable retarders and a linear polarizer, the polarizer analyzer analyzing a phase delay and orientation changes of the principle axes of the probe beam induced by the THz electric field and polarization.

21 Claims, 4 Drawing Sheets

(56) References Cited

U.S. PATENT DOCUMENTS

2014/0264032 A1 9/2014 Neshat et al.
2015/0192467 A1 7/2015 Sharma et al.
2018/0306716 A1* 10/2018 Ashrafi ................ G01N 21/636

OTHER PUBLICATIONS

Jiang, Zhiping, and Zhang, Xi-Cheng, Terahertz imaging via electrooptic effect, IEEE Transactions on microwave theory and techniques 47.12 (1999): 2644-2650.
Kampfrath, Tobias, Tanaka, Koichiro and Nelson, Keith A., "Resonant and nonresonant control over matter and light by intense terahertz transients." Nature Photonics 7.9 (2013): 680-690.
Kono, S., Tani, M., Gu, P., and Sakai, K., "Detection of up to 20 Terahertz (THz) with a low-temperature-grown GaAs photoconductive antenna gated with 15 fs light pulses," Applied Physics Letters 77, 4104-4106 (2000).
Lu, X., and Zhang, X. C., "Balanced terahertz wave air-biased-coherent-detection", Applied Physics Letters 98, 151111-151113 (2011).
Macias-Romero, C. and Torok, P., Eigenvalue calibration methods for polarimetry, Journal of the European Optical Society-Rapid publications, 7, 2012.
Peinado, Alba, Lizana, Angel, Vidal, Josep, Lemmi, Claudio and Campos, Juan, Optimization and performance criteria of a stokes polarimeter based on two variable retarders, Optics express, 18(10):9815-9830, 2010.
Sharma, G., Singh, K., Ibrahim, A., Al-Naib, I., Morandotti, R., Vidal, F., & Ozaki, T. (2013). Self-referenced spectral domain interferometry for improved signal-to-noise measurement of terahertz radiation. Optics letters, 38(15), 2705-2707.
Zhang, Xi-Cheng, and Xu, Jingzhou, Introduction to Terahertz (THz) wave photonics. New York: Springer, 2010.
Woolard, D. L., Loerop, W. R. and M. S. Shur, Terahertz Sensing Technology (World Scientific, New Jersey, 2003).
Wu, Q., and Zhang, X. C., Free-space electro-optic sampling of terahertz beams, Applied Physics Letters 67, 3523-3525 (1995).
Yasumatsu, Naoya and Watanabe, Shinichi, Precise real-time polarization measurement of terahertz electromagnetic waves by a spinning electrooptic sensor, Review of Scientific Instruments, 83(2):023104, 2012.

* cited by examiner

METHOD AND SYSTEM FOR TERAHERTZ RADIATION DETECTION AND CHARACTERIZATION

CROSS-REFERENCE TO RELATED APPLICATIONS

This application is a National Entry Application of PCT application no PCT/CA2017/050852 filed on Jul. 14, 2017 and published in English under PCT Article 21(2) as WO 2018/014118, which itself claims benefit of U.S. provisional application Ser. No. 62/364,377, filed on Jul. 20, 2016. All documents above are incorporated herein in their entirety by reference.

FIELD OF THE INVENTION

The present invention relates to terahertz radiation. More specifically, the present invention is concerned with a method and a system for terahertz radiation detection and characterization.

BACKGROUND OF THE INVENTION

During the last two decades, the development of Terahertz (THz) photonics has successfully bridged the so-called "Terahertz (THz) gap" between the radio frequencies and the far-infrared. As a result of extensive research, Terahertz (THz) technology has become one of the most powerful technologies in the areas of spectroscopy, imaging and security [1]. Many advantages, such as contact-free and quasi-static conductivity measurement and coherent detection for example, make Terahertz (THz) spectroscopy a unique tool to study optical and electronic properties of various materials, including nanomaterials as well as biological and chemical molecules. Recently, the development of intense Terahertz (THz) sources has opened the possibility for Terahertz (THz) transient pulses to control matter and light resonantly and nonresonantly [2].

Various methods, such as the photoconductive antenna [3], electro-optic (EO) sampling [4], air-biased-coherent-detection [5] (ABCD) and spectral-domain interferometric (SDI) [6] methods, have been proposed and demonstrated to measure the spatial and temporal profile of the Terahertz (THz) electric field.

Among these, the electro-optic (EO) sampling method is widely used for Terahertz (THz) time-domain spectroscopy (THz-TDS), due to its wide bandwidth and simple experiment configuration [7].

The electro-optic (EO) sampling method is based on the Pockels effect, in which the Terahertz (THz) quasi-static field induces birefringence in a nonlinear crystal. The induced birefringence then changes the polarization of the optical probe beam, which co-propagates collinearly with the Terahertz (THz) pulse. The change in the phase between the two polarization components of the probe beam can be measured by using cross or balanced measurement [8]. The intensity modulation of the probe beam or the difference in the balanced measurement is linearly proportional to the Terahertz (THz) electric field. The complete Terahertz (THz) waveform can thus be reconstructed by scanning the probe pulse over the entire Terahertz (THz) pulse.

With the rapid development in coherent Terahertz (THz) science and technology, there is a need to fully characterize the Terahertz (THz) beam, which would include measuring the full temporal and spatial profile of the Terahertz (THz) electric field as well as its polarization.

A fast and accurate method that can determine the Terahertz (THz) polarization state is extremely important for polarization imaging applications as well as Terahertz (THz) Faraday or Kerr rotation spectroscopy [9]. The method would need a high signal-to-noise ratio (SNR), sensitivity and retain the unique feature of coherent detection.

While there have been methods developed to measure the spatial-temporal measurement of the Terahertz (THz) electric field or Terahertz (THz) polarization, there is no single method that could measure both simultaneously at the same time.

As far as methods for coherent spatial-temporal measurement of the Terahertz (THz) electric field are concerned, to realize real-time measurement of Terahertz (THz) spatial distribution based on electro-optic (EO) sampling, cross measurement with two cross-polarizers can be used but with a relatively low signal-to-noise ratio (SNR) as well as spectral resolution [10], [11]. The point scanning system can give high signal-to-noise ratio (SNR) and sensitivity by scanning the object mechanically, but it is not suitable for electro-optic (EO) sampling detection of Terahertz (THz) spatial distribution, because realignment is essential after each measurement.

As far as Terahertz (THz) polarization measurement: is concerned, conventional electro-optic (EO) sampling methods lack the capability to determine the variation of the Terahertz (THz) polarization state, because any polarization change will be converted into the variation in the phase delay, corresponding to a change in the Terahertz (THz) electric field. The methods of manually rotating the wire-grid polarizers always need to measure the two orthogonal polarization states of the Terahertz (THz) beam, which results in relatively long and cumbersome experiments with low signal-to-noise ratio (SNR) results, due to the Terahertz (THz) amplitude fluctuations between the two measurements.

As far as over-rotation is concerned, a major limit of electro-optic (EO) sampling detection is the polarization over-rotation of the probe beam. All the methods up to now that are based on electro-optic (EO) sampling use two cross polarizers, i.e. a first one placed before the detection crystal and a second one placed after the detection crystal, to measure the polarization rotation of the probe beam, from which one evaluates the Terahertz (THz) electric field. However, if electro-optic (EO) sampling results in the polarization of the probe beam to rotate more than 90°, it will lead to reversal in the intensity modulation of the detection beam, thus providing incorrect measurement of the Terahertz (THz) electric field. In addition, the issue of over-rotation increases with increasing thickness of the crystal but thicker crystal is favorable to high spectral resolution. Normally several silicon wafers are placed before the detection crystal in order to suppress the Terahertz (THz) electric field. However, due to dispersion and absorption, these silicon wafers will distort the Terahertz (THz) waveform and limit the accuracy of the measurement. The spectral-domain interferometric (SDI) method has resolved the problem of over-rotation, but the maximum phase difference that could be measured is limited by the depth range of spectral domain interferometry.

There is still a need for a method and a system for terahertz radiation detection.

SUMMARY OF THE INVENTION

More specifically, in accordance with the present invention, there is provided a terahertz detection system, comprising a terahertz beam source, a probe beam source, a detection crystal receiving a probe beam from the probe beam source and a terahertz beam from the terahertz beam source, the probe beam and the terahertz beam co-propagating collinearly through the detection crystal, and a polarizer analyser receiving the pump beam transmitted from the detection crystal, wherein the polarizer analyser comprises two liquid crystal variable retarders and a linear polarizer, the polarizer analyzer analyzing a phase delay and orientation changes of the principle axes of the probe beam induced by the THz electric field and polarization.

There is further provided a method for characterizing a terahertz beam, comprising copropagating the terahertz beam and an optical probe beam in a detection crystal and using a polarization analyzer comprising two liquid crystal variable retarders and a linear polarizer to analyze the phase delay and the orientation of the principle axes induced by the terahertz electric field and polarization.

There is further provided a method for characterizing a terahertz beam, comprising transmitting a probe beam of a known polarization state and a THz beam to be investigated through a detection crystal and a polarization state analyzer comprising two liquid crystal variable retarders and a linear polarizer, detecting the probe beam intensity modulation at different spatial positions, determining a phase delay and orientation changes of the principle axes of the probe beam using the detected probe beam intensity modulation at different spatial positions; and from the polarization information of the probe beam, determining the THz field, polarization and spatial profile.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1:
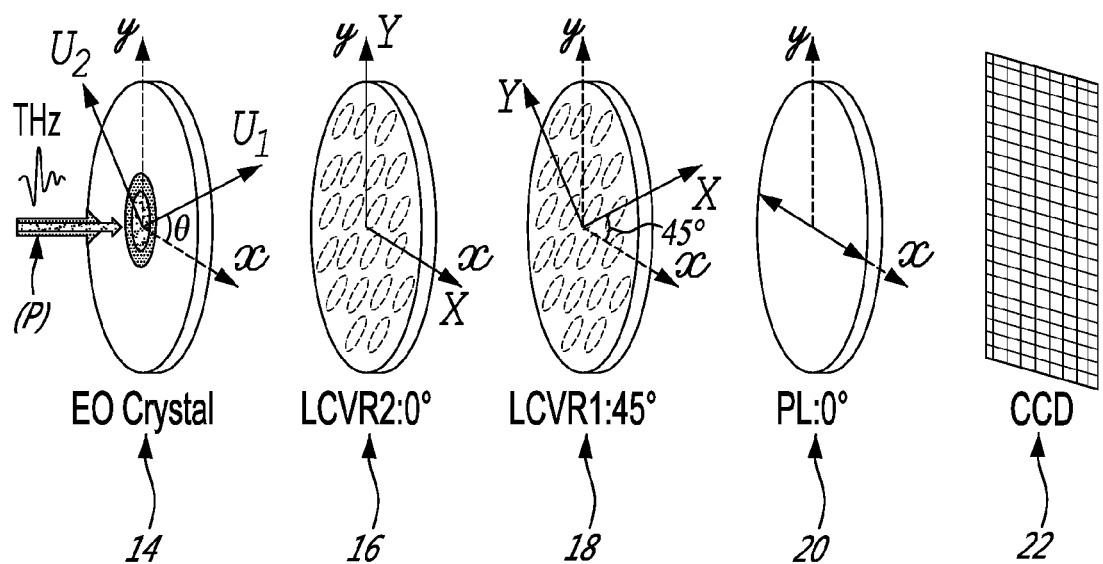
FIG. 1 is schematic definition of angles of the [−110] direction of a (110)-orientated GaP crystal, the polarization direction of the Terahertz (THz) field ($E_{THz}$), the Terahertz (THz) induced principle axes ($U_1$ and $U_2$) of the refractive-index ellipsoids, and the linear polarisation of the optical probe beam.

The present invention is illustrated in further details by the following non-limiting examples.

In a nutshell, there is provided a method and a system for measuring the Terahertz (THz) spatial profile, temporal waveform and polarization state simultaneously, within a single measurement. The method and the system allow over-rotation to be naturally resolved, and unlimited dynamic range is possible.

In a Stokes-Mueller configuration, a wide optical probe beam is used to cover the whole Terahertz (THz) spot within the detection crystal. Therefore, self-referenced detection can be realized that can dramatically reduce noises due to mechanical vibrations [12]. A polarization analyzer comprising two liquid crystal variable retarders (LCVRs) and a linear polarizer is used to analyze the phase delay and the orientation of the principle axes induced by Terahertz (THz) electric field and polarization. An ultra-fast charge-coupled device (CCD) camera is used to capture the probe beam intensity modulation at different spatial position. The Terahertz (THz) temporal profile is obtained by temporally scanning the probe pulse over the entire Terahertz (THz) pulse.

A summary of the Stokes-Mueller polarimetry is now provided.

The polarization state of light can be fully expressed using the Stokes vector, which is:

$$S = \begin{pmatrix} I_x + I_y \\ I_x - I_y \\ I_{45°} - I_{-45°} \\ I_{rc} - I_{lc} \end{pmatrix} = \begin{pmatrix} I \\ Q \\ U \\ V \end{pmatrix} = \begin{pmatrix} S_0 \\ S_1 \\ S_2 \\ S_3 \end{pmatrix} \quad (1)$$

Here, $S_0$ represents the total intensity of the optical beam; $S_1$ is the intensity difference between horizontal and vertical polarization; $S_2$ describes the preponderance of +45° and −45° linear polarized light; and $S_3$ is the intensity difference between right-hand circular polarization and left-hand circular polarization. Therefore, Stokes parameters can represent all possible polarization states, and even partially polarized or non-polarized light. It is worth noting that here only the first parameter $S_0$ (total intensity) is observable.

Optical elements such as wave plates and polarisers are often used to adjust the polarisation state of light. In the Stokes-Mueller polarimetry, a 4*4 transformation matrix known as the Mueller matrix is used to represent the polarizing properties of such optical components. By knowing the Mueller matrix of the optical system and the Stokes vector of the incident optical beam, a simple matrix multiplication can give the polarisation state of the transmitted be:

$$S_t = M_{system} * S_{in} = \begin{pmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{pmatrix} \begin{pmatrix} S_0 \\ S_1 \\ S_2 \\ S_3 \end{pmatrix} \quad (2)$$

The objective of the Stokes-Mueller polarimetry is to find unknown Stokes parameters of incident or transmitted optical beam or unknown Mueller matrix of a certain object from intensity measurement. As a result, the Stokes-Mueller system generally includes a polarisation analyser and a polarisation generator with adjustable Mueller matrix due to the single observable of total intensity. As a consequence, at least four (4) measurements are required to measure the Stokes parameters, and sixteen (16) measurements are necessary for the Mueller matrix measurement. For example, the Stokes parameters of the incident light can be obtained from the intensities (I) using matrix inverse operation with a new matrix known as the instrument Matrix [13], which is constructed by the four first rows of the Mueller matrix of the analyser system:

$$\begin{pmatrix} I_1 \\ I_2 \\ I_3 \\ I_4 \end{pmatrix} = \begin{pmatrix} M_{11,1} & M_{12,1} & M_{13,1} & M_{14,1} \\ M_{11,2} & M_{12,2} & M_{13,2} & M_{14,2} \\ M_{11,3} & M_{12,3} & M_{13,3} & M_{14,3} \\ M_{11,4} & M_{12,4} & M_{13,4} & M_{14,4} \end{pmatrix} \begin{pmatrix} S_0 \\ S_1 \\ S_2 \\ S_3 \end{pmatrix} \quad (3)$$

In the present invention, Terahertz (THz) detection using Stokes-Mueller polarimetry is based on the Pockels effect. Unlike conventional electro-optic (EO) sampling technique, the intensity modulations from Stokes-Mueller polarimetry include the information on the complete polarization state of the probe beam. Without birefringence induced by the Pockels effect, the detection crystal is only a phase plate corresponding to a reference Stokes vector that remains the same polarization state. With Terahertz (THz) induced birefringence, the detection crystal becomes a wave plate with its phase delay and principle axes controlled by the Terahertz (THz) field amplitude and polarization orientation, respectively. The measured Stokes parameters of the probe beam after the detection crystal can be converted directly into the Terahertz (THz) field and polarization orientation, which is not possible using conventional electro-optic (EO) sampling techniques. By replacing the photodiodes with an ultra-fast charge-coupled device (CCD) camera, the Terahertz (THz) spatial profile at each time point can be obtained as well. To give a clear explanation, it is assumed that the optical probe beam and the Terahertz (THz) beam are horizontally polarized along the x-axis that is the [−1 1 0] direction of the (110)-oriented GaP detector crystal.

For the reference region without Terahertz (THz) illumination, the Stokes vector remains the same as the incident light that possess horizontal linear polarization state:

$$S_{noTHz} = S_{incident} = \begin{pmatrix} 1 \\ 1 \\ 0 \\ 0 \end{pmatrix} \quad (4)$$

On the other hand, when the Terahertz (THz) electric field induces birefringence, the electro-optic (EO) crystal becomes a wave plate with its principle axes determined by the Terahertz (THz) polarization direction [14]:

$$\cos 2\theta = \frac{\sin \alpha}{\sqrt{1 + 3\cos^2 \alpha}} \quad (5)$$

Here, $\alpha$ is the angle of the Terahertz (THz) polarization with respect to the x-axis. $\theta$ is the principle axes rotation angle with respect to the x-axis, which is equal to 45° when the Terahertz (THz) polarization is horizontally oriented. The Stokes vector of the transmission beam then becomes:

$$S_{THz} = M_c * S_{in} = \begin{pmatrix} 1 & 0 & 0 & 0 \\ 0 & \cos\phi & 0 & \sin\phi \\ 0 & 0 & 1 & 0 \\ 0 & -\sin\phi & 0 & \cos\phi \end{pmatrix} \begin{pmatrix} 1 \\ 1 \\ 0 \\ 0 \end{pmatrix} = \begin{pmatrix} 1 \\ \cos\phi \\ 0 \\ -\sin\phi \end{pmatrix} \quad (6)$$

where $\Phi$ is the phase delay, which is linearly proportional to the Terahertz (THz) electric field. From this relation, it is obvious that the over-rotation issue is resolved naturally. The phase retardation $\Phi$ experienced by the probe beam due to the Pockels effect over a propagation distance L is given as [14]:

$$\phi = \frac{\omega L}{2c} n^3 r_{41} E_{THz} \sqrt{1 + 3\cos^2 \alpha} \quad (7)$$

Here n is the refractive index at the optical frequency and $r_{41}$ is the electro-optic (EO) coefficient. $\alpha$ is zero in most cases but in some applications such as Terahertz (THz) Faraday or rotation spectroscopy, the Terahertz (THz) polarization orientation is no longer invariant such that the principle axis of the detection crystal differs from $\theta=45°$ (shown in FIG. 1). The Mueller matrix of the detection crystal will then be:

$$M_c = \begin{pmatrix} 1 & 0 & 0 & 0 \\ 0 & \cos^2 2\theta + \cos\phi \sin^2 2\theta & (1-\cos\phi)\sin 2\theta \cos 2\theta & \sin\phi \sin 2\theta \\ 0 & (1-\cos\phi)\sin 2\theta \cos 2\theta & \sin^2 2\theta + \cos\phi \cos^2 2\theta & -\sin\phi \cos 2\theta \\ 0 & -\sin\phi \sin 2\theta & \sin\phi \cos 2\theta & \cos\phi \end{pmatrix} \quad (8)$$

Then the transmitted Stokes vector is:

$$S_{THz} = M_{Pockel} * S_{incident} = \begin{pmatrix} 1 \\ \cos^2 2\theta + \cos\phi_b \sin^2 2\theta \\ (1-\cos\phi)\sin 2\theta \cos 2\theta \\ -\sin\phi \sin 2\theta \end{pmatrix} \quad (9)$$

Compared with relation (6), the third parameter $S_2$ is no longer zero suggesting a self-referenced Terahertz (THz) polarisation measurement. The corresponding Terahertz (THz) electric field and polarization orientation can be easily obtained from relations (5), (7) and (9). The polarization state of the probe beam before the detection crystal can be adjusted to circular polarization in order to avoid the situation where the principle axes are along x-axis and y-axis.

Two inverse calculation methods are normally used in Stokes-Mueller polarimetry, i.e. the matrix inverse operation and the Fourier-transform method. The polarization analyser system is required to meet the inverse condition in which at least four independent polarization states are necessary to be generated by the analyser system. Recently, liquid crystal variable retarders (LCVRs) have attracted much attention and have been widely used in polarimetry [15]. The phase delay of liquid crystal variable retarders is controlled by voltage with a high operation speed and stability. In addition, both the matrix inverse operation method and Fourier-transform method are possible to realize using liquid crystal variable retarder-based system due to the high operation speed.

Figure 2:
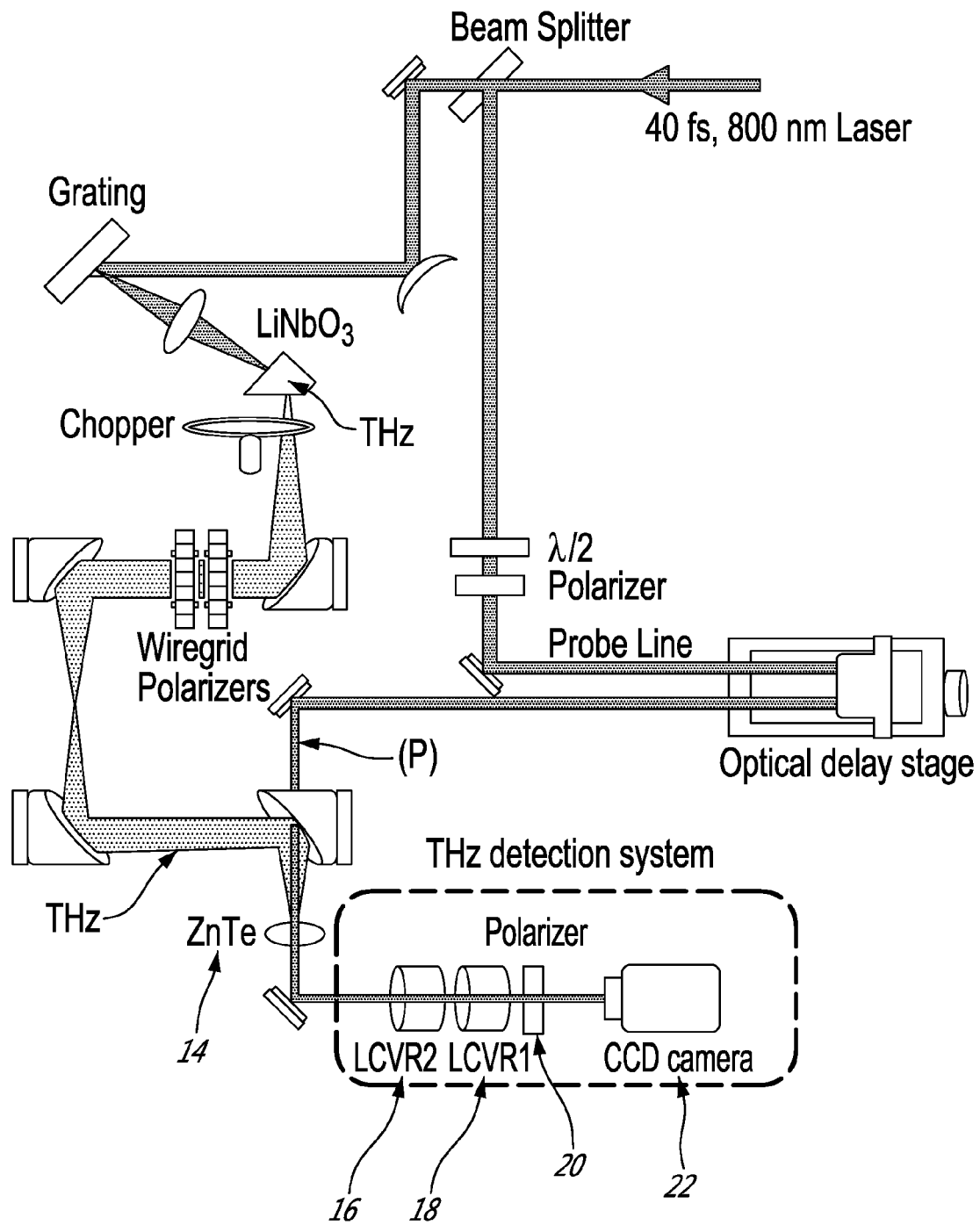
FIG. 2 is a schematical view of a Terahertz (THz) detection system according to an embodiment of an aspect of the present invention.
Figure 3:
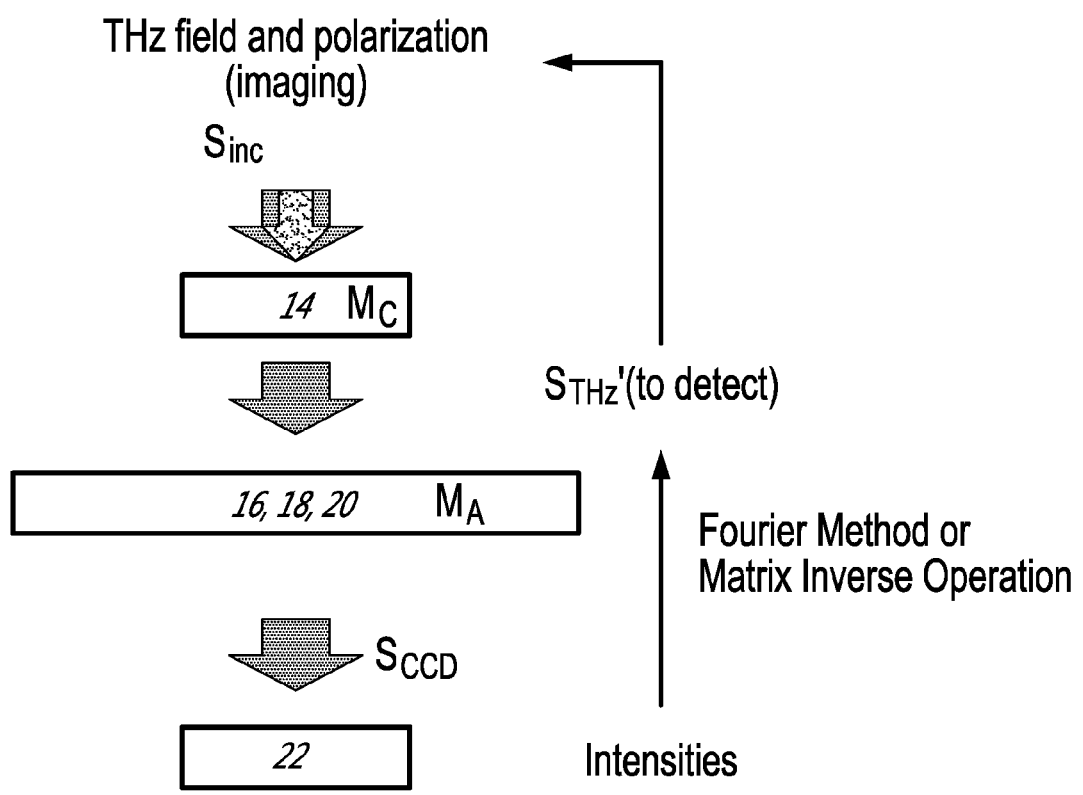
FIG. 3 is a flowchart of a method according to an embodiment of an aspect of the present invention.
Figure 4:
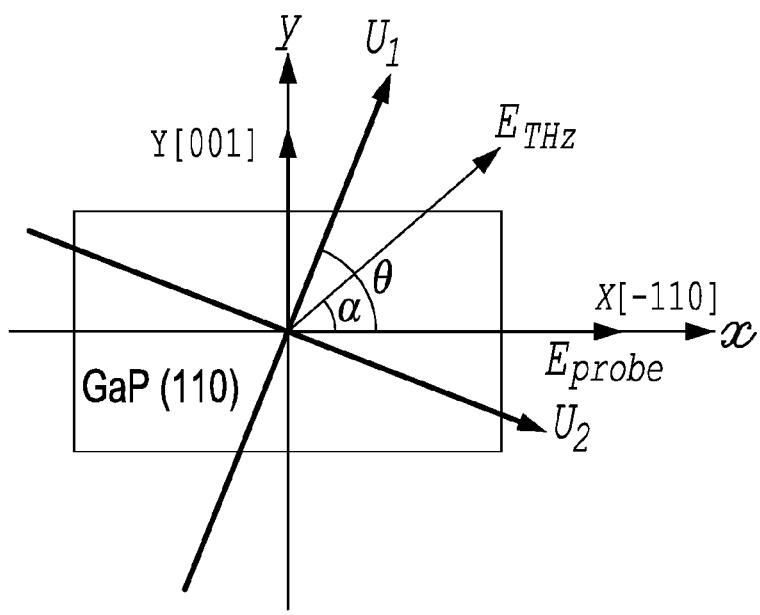
FIG. 4 is a schematic definition of angles of the [−110] direction of a (110)-orientated GaP crystal, the polarization direction of the Terahertz (Thz) field ($E_{THz}$), the Terahertz (THz) induced principle axes ($U_1$ and $U_2$) of the refractive-index ellipsoids, and the linear polarisation of the optical probe beam.

In order to obtain the optimal experiment accuracy and signal-to-noise ratio (SNR), a two liquid crystal variable retarders analyser system as illustrated in FIG. 2 is used to measure the Terahertz (THz) signal [15].

As illustrated in FIG. 2, the system comprises a detection crystal, a first liquid crystal variable retarder (LCVR2) with one principle axis oriented along 45°, a second liquid crystal variable retarder (LCVR1) oriented along x-axis, a linear polariser (PL) with its transmission axis along x-axis and a CCD camera.

In order to measure the Terahertz (THz) spatial field distribution, a wide probe beam that has a larger spot size within the detection crystal compared with the Terahertz (THz) beam was used. Instead of using photo-diodes, a high-speed CCD camera was used to measure the intensity modulation on each pixel.

A Fourier-transform method will now be described. Alternatively, a method of matrix inverse as known in the art may be used, which only needs four measurements and selection of phase delays.

The orientation angles of the liquid crystal variable retarders and of the linear polariser are chosen just to simplify the alignment in laboratory. The Stokes vector after this analyser system is:

$$S_{CCD} = \begin{pmatrix} f \\ s_{CCD1} \\ s_{CCD2} \\ s_{CCD3} \end{pmatrix} = M_A * S_{THz} \quad (10)$$

$$= 0.5 \begin{pmatrix} 1 & \cos\omega_1 t & \sin\omega_1 t \sin\omega_2 t & \sin\omega_1 t \cos\omega_2 t \\ 1 & \cos\omega_1 t & \sin\omega_1 t \sin\omega_2 t & \sin\omega_1 t \cos\omega_2 t \\ 0 & 0 & 0 & 0 \\ 0 & 0 & 0 & 0 \end{pmatrix} \begin{pmatrix} S_0 \\ S_1 \\ S_2 \\ S_3 \end{pmatrix} \quad (11)$$

Here, $\omega_1$ and $\omega_2$ are the angular velocity of the delay phase depending on the liquid crystal variable retarder operation frequency and applied voltage. The modulation intensities thus include all the Stokes parameters related to the Terahertz (THz) field and polarisation for each pixel on the CCD camera:

$$I = 0.5 * (S_0 + S_1 \cos\omega_1 t + S_2 \sin\omega_1 t \sin\omega_2 t + S_3 \sin\omega_1 t \cos\omega_2 t) \quad (12)$$

In this configuration, $\omega 1$ and $\omega 2$ are adjustable parameters depending on the specific system and the required operation speed, sensitivity as well as signal-to-noise ratio (SNR). To further improve the signal-to-noise ratio (SNR), the analyser system can be operated in the lock-in fashion by synchronizing to the optical chopper or by combining with a 2-D lock-in amplifier. Balanced detection is also feasible for Fourier transform method where the DC signal can be removed.

The dynamic range of the system including two liquid crystal variable retarders and one linear polarizer and the method was experimentally tested using linearly polarized laser beam with various orientations. The polarization orientation of the incident beam was controlled via a linear polarizer and then measured by using the method of matrix inverse. It was successfully shown that the system reproduced these orientations with no limitation of over-rotation, thereby demonstrating theoretical unlimited dynamic range without limitation of over-rotation.

The above demonstrates a simple system, using Stokes-Mueller polarimetry to measure the phase retardation and principle axes orientation of electro-optic (EO) crystal induced by the Terahertz (THz) electric field and polarization in a single measurement. The present method allows the use of more sensitive as well as thicker detection crystals, which in turn allows increasing the sensitivity and achieve higher the signal-to-noise ratio (SNR), by solving the problem of over-rotation for intense Terahertz (THz) sources.

The four Stokes parameters for each pixel allow the system to operate with probe beams of large dimensions, which can be extended to Terahertz (THz) imaging applications. The wide adjustability of liquid crystal variable retarder-based analyser system allows the possibility to achieve high signal-to-noise (SNR) and sensitivity compared with conventional cross measurement.

It was thus shown that by using the Stokes-Mueller polarimetry detection method, a single measurement can be performed that simultaneously provides spatial distribution, waveform, and polarization states of the Terahertz (THz) electric field. In addition, owing to the complete polarization information contained in Stokes parameters, the over-rotation problem can be naturally resolved.

The ability to simultaneously measure the Terahertz (THz) spatial-temporal profile and Terahertz (THz) polarization with high signal-to-noise ratio (SNR) and sensitivity can not only provide more abundant information but also reduce dramatically the experimental time in Terahertz (THz) time-domain spectroscopy (THz-TDS). Owing to the spatial profile information and unlimited dynamic range due to the lack of problems related to over-rotation, nonlinear Terahertz (THz) spectroscopy can be realized easily by only one measurement without tuning the two wire-grid polarizers manually or using the Z-scan technique.

The scope of the claims should not be limited by the embodiments set forth in the examples, but should be given the broadest interpretation consistent with the description as a whole.

REFERENCES

1. D. L. Woolard, W. R. Loerop, and M. S. Shur, Terahertz Sensing Technology (World Scientific, New Jersey, 2003).
2. Kampfrath, Tobias, Koichiro Tanaka, and Keith A. Nelson, "Resonant and nonresonant control over matter and light by intense terahertz transients." Nature Photonics 7.9 (2013): 680-690.
3. S. Kono, M. Tani, P. Gu, and K. Sakai, "Detection of up to 20 Terahertz (THz) with a low-temperature-grown GaAs photoconductive antenna gated with 15 fs light pulses," Applied Physics Letters 77, 4104-4106 (2000).
4. X.-C. Zhang, J. A. Riordan, and F.-G. Sun, "Electro-optical and magneto-optical sensing apparatus and method for characterizing free-space electromagnetic radiation", U.S. patent, ed. (Rensselaer Polytechnic Institute USA, 2000).
5. X. Lu, and X. C. Zhang, "Balanced terahertz wave air-biased-coherent-detection," Applied Physics Letters 98, 151111-151113 (2011).
6. Sharma, Gargi, Kanwarpal Singh, Roberto Morandotti, and Tsuneyuki Ozaki. "SPECTRAL-DOMAIN INTERFEROMETRIC METHOD AND SYSTEM FOR CHARACTERIZING TERAHERTZ RADIATION." U.S. Pat. No. 20,150,192,467, issued Jul. 9, 2015.
7. Q. Wu, and X. C. Zhang, "Free-space electro-optic sampling of terahertz beams," Applied Physics Letters 67, 3523-3525 (1995).
8. Zhang, Xi-Cheng, and Jingzhou Xu. Introduction to Terahertz (THz) wave photonics. New York: Springer, 2010.
9. Yasumatsu, Naoya, and Shinichi Watanabe. "Precise real-time polarization measurement of terahertz electromagnetic waves by a spinning electro-optic sensor." Review of Scientific Instruments 83.2 (2012): 023104.

10. Jiang, Zhiping, and Xi-Cheng Zhang. "Terahertz imaging via electrooptic effect." IEEE Transactions on microwave theory and techniques 47.12 (1999): 2644-2650.
11. Chan, Wai Lam, Jason Deibel, and Daniel M. Mittleman. "Imaging with terahertz radiation." Reports on progress in physics 70.8 (2007): 1325.
12. Sharma, G., Singh, K., Ibrahim, A., Al-Naib, I., Morandotti, R., Vidal, F., & Ozaki, T. (2013). Self-referenced spectral domain interferometry for improved signal-to-noise measurement of terahertz radiation. Optics letters, 38(15), 2705-2707.
13. C Macias-Romero and P Torok, Eigenvalue calibration methods for polarimetry, Journal of the European Optical Society-Rapid publications, 7, 2012.
14. Naoya Yasumatsu and Shinichi Watanabe, Precise real-time polarization measurement of terahertz electromagnetic waves by a spinning electrooptic sensor, Review of Scientific Instruments, 83(2):023104, 2012.
15. Alba Peinado, Angel Lizana, Josep Vidal, Claudio Lemmi, and Juan Campos, Optimization and performance criteria of a stokes polarimeter based on two variable retarders, Optics express, 18(10):9815-9830, 2010.
16. U.S. Pat. No. 5,045,701
17. US 2014/0264032

The invention claimed is:

1. A terahertz detection system, comprising:
a terahertz beam source;
a probe beam source;
a detection crystal receiving a probe beam from said probe beam source and a terahertz beam from said terahertz beam source, the probe beam and the terahertz beam copropagating collinearly through the detection crystal; and
a polarizer analyzer receiving a pump beam transmitted from said detection crystal;
wherein said polarizer analyzer comprises two liquid crystal variable retarders and a linear polarizer, said polarizer analyzer analyzing a phase delay and orientation changes of the principle axes of the probe beam induced by the THz electric field and polarization.

2. The terahertz detection system of claim 1, further comprising a high-speed charge-coupled device camera capturing the probe beam intensity modulation at different spatial positions.

3. The terahertz detection system of claim 1, wherein said detection crystal is a nonlinear crystal.

4. The terahertz detection system of claim 1, further comprising an optical delay line to vary the time between the terahertz beam and the probe beam.

5. The terahertz detection system of claim 1, wherein said detection crystal is one of a ZnTe, GaP, LiNbO3, LiTaO3, CdTe and GaSe crystal.

6. The terahertz detection system of claim 1, wherein said detection crystal has a thickness in a range between about 0.1 mm and 5 mm.

7. The terahertz detection system of claim 1, wherein said probe beam has a spot size within the detection crystal of at least a size of the terahertz beam.

8. The terahertz detection system of claim 1, wherein said probe beam has a larger spot size within the detection crystal than the terahertz beam.

9. The system of claim 1, further comprising an optical delay line used to vary the time between the THz beam and the probe beam.

10. The system of claim 1, wherein a first one of the liquid crystal variable retarders is oriented along the x-axis, a second one of the liquid crystal variable retarders is oriented at 45° from the x-axis, and the linear polarizer is positioned with transmission axis thereof along the x-axis.

11. The system of claim 1, further comprising an optical chopper, said polarizer analyzer being synchronized to said optical chopper.

12. A method for characterizing a terahertz beam, comprising copropagating the terahertz beam and an optical probe beam in a detection crystal and using a polarizer analyzer comprising two liquid crystal variable retarders and a linear polarizer to analyze the phase delay and the orientation of the principle axes induced by the terahertz electric field and polarization.

13. The method of claim 12, comprising capturing the probe beam intensity modulation at different spatial positions after the polarization analyzer and measuring the spatial field and polarization distribution of the terahertz beam therefrom.

14. The method of claim 12, comprising scanning the probe beam over the entire terahertz beam.

15. The method of claim 12, comprising using an optical delay line to vary the time between the THz beam and the probe beam.

16. The method of claim 12, wherein the detection crystal is one of a ZnTe, GaP, LiNbO3, LiTaO3, CdTe and GaSe crystal.

17. The method of claim 12, wherein the detection crystal has a thickness in a range between about 0.1 mm and 5 mm.

18. The method of claim 12, comprising selecting a probe beam having a spot size within the detection crystal of at least a size of the terahertz beam.

19. The method of claim 12, comprising operating the polarizer analyzer in a lock-in mode.

20. The method of claim 12, comprising using the polarizer analyzer to obtain the four Stokes parameters of the probe beam, and determining the THz electric field and the polarization state from the Stokes parameters of the probe beam.

21. A method for characterizing a terahertz beam, comprising transmitting a probe beam of a known polarization state and a THz beam to be investigated through a detection crystal and a polarization state analyzer comprising two liquid crystal variable retarders and a linear polarizer, detecting the probe beam intensity modulation at different spatial positions, determining a phase delay and orientation changes of the principle axes of the probe beam using the detected probe beam intensity modulation at different spatial positions; and from the polarization information of the probe beam, determining the THz field, polarization and spatial profile.

* * * * *